US009625954B2

(12) United States Patent
Campbell et al.

(10) Patent No.: US 9,625,954 B2
(45) Date of Patent: Apr. 18, 2017

(54) MULTI-PIVOT HINGE

(71) Applicant: Microsoft Technology Licensing, LLC, Redmond, WA (US)

(72) Inventors: John Campbell, Puyallup, WA (US); Brian Bitz, Sherwood, OR (US); Errol Mark Tazbaz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/555,184

(22) Filed: Nov. 26, 2014

(65) Prior Publication Data

US 2016/0147267 A1 May 26, 2016

(51) Int. Cl.
| | | |
|---|---|---|
| *G06F 1/16* | (2006.01) | |
| *E05D 3/06* | (2006.01) | |
| *E05D 11/00* | (2006.01) | |
| *E05D 11/06* | (2006.01) | |
| *H04M 1/02* | (2006.01) | |
| *E05D 7/12* | (2006.01) | |
| *E05D 11/10* | (2006.01) | |

(52) U.S. Cl.
CPC ............ *G06F 1/1681* (2013.01); *E05D 3/06* (2013.01); *E05D 7/12* (2013.01); *E05D 11/0054* (2013.01); *E05D 11/0081* (2013.01); *E05D 11/06* (2013.01); *E05D 11/1014* (2013.01); *G06F 1/1616* (2013.01); *H04M 1/022* (2013.01); *H04M 1/0216* (2013.01); *E05D 2007/128* (2013.01); *E05Y 2900/606* (2013.01)

(58) Field of Classification Search
CPC combination set(s) only.
See application file for complete search history.

(56) References Cited

U.S. PATENT DOCUMENTS

| | | | |
|---|---|---|---|
| 4,611,710 | A | 9/1986 | Mitsufuji |
| 4,711,046 | A | 12/1987 | Herrgord |
| 5,056,192 | A | 10/1991 | Grass |
| 5,229,921 | A | 7/1993 | Bohmer |
| 5,509,590 | A | 4/1996 | Medeiros et al. |

(Continued)

FOREIGN PATENT DOCUMENTS

| | | |
|---|---|---|
| CN | 204553530 U | 8/2015 |
| EP | 1340879 A2 | 9/2003 |

(Continued)

OTHER PUBLICATIONS

"Moving Point Hinge-Multipivot Hinge", Retrieved on: Oct. 9, 2014, Available at: <<http://websystem.gismo.se/Gismo/files/1029/2.mph%2001%20introduktion.pdf>>, 6 pages.

(Continued)

*Primary Examiner* — Lisa Lea Edmonds
(74) *Attorney, Agent, or Firm* — Rainier Patents, P.S.

(57) ABSTRACT

The description relates to devices, such as computing devices that have hinged portions. One example can include a first portion and a second portion. This example can also include a sequential multi-pivot hinge assembly rotatably securing the first portion and the second portion. The sequential multi-pivot hinge assembly can include rotation control elements configured to control a relative order of rotation around axes of rotation of the sequential multi-pivot hinge assembly.

19 Claims, 9 Drawing Sheets

(56) References Cited

U.S. PATENT DOCUMENTS

| | | |
|---|---|---|
| 5,796,575 A | 8/1998 | Podwalny et al. |
| 5,845,366 A | 12/1998 | Kuroda |
| 5,987,704 A | 11/1999 | Tang |
| 6,223,393 B1* | 5/2001 | Knopf .................... G06F 1/1681 16/366 |
| 6,470,532 B2 | 10/2002 | Rude |
| 6,505,382 B1 | 1/2003 | Lam et al. |
| 6,527,036 B1 | 3/2003 | Welsh |
| 6,754,081 B2 | 6/2004 | Rude et al. |
| 6,757,160 B2 | 6/2004 | Moore et al. |
| 6,831,229 B1 | 12/2004 | Maatta et al. |
| 6,966,435 B2 | 11/2005 | Weiser et al. |
| 7,227,741 B2 | 6/2007 | Garel et al. |
| 7,251,129 B2 | 7/2007 | Lee et al. |
| 7,293,380 B2 | 11/2007 | Repecki |
| 7,418,766 B2 | 9/2008 | Nelson et al. |
| 7,520,025 B2 | 4/2009 | Hung |
| 7,584,524 B2 | 9/2009 | Hung |
| 7,636,985 B2 | 12/2009 | Greenbank |
| 8,024,843 B2 | 9/2011 | Endo et al. |
| 8,122,970 B2 | 2/2012 | Palen |
| 8,441,791 B2 | 5/2013 | Bohn et al. |
| 8,467,838 B2 | 6/2013 | Griffin et al. |
| 8,624,844 B2 | 1/2014 | Behar et al. |
| 8,649,166 B2 | 2/2014 | Wu et al. |
| 8,687,359 B2 | 4/2014 | Theobald et al. |
| 8,713,759 B2 | 5/2014 | Cai |
| 8,743,538 B2 | 6/2014 | Ashcraft et al. |
| 8,797,727 B2 | 8/2014 | Ashcraft et al. |
| 8,804,324 B2 | 8/2014 | Bohn et al. |
| 8,843,183 B2 | 9/2014 | Griffin et al. |
| 8,854,834 B2 | 10/2014 | O'Connor et al. |
| 9,243,432 B2* | 1/2016 | Lee .......................... E05D 3/06 |
| 2005/0122671 A1 | 6/2005 | Homer |
| 2006/0079277 A1 | 4/2006 | Ditzik |
| 2007/0039132 A1 | 2/2007 | Jung et al. |
| 2007/0049376 A1 | 3/2007 | Cho et al. |
| 2007/0117600 A1 | 5/2007 | Robertson et al. |
| 2008/0174089 A1 | 7/2008 | Ekberg |
| 2010/0154171 A1 | 6/2010 | Lombardi et al. |
| 2010/0232100 A1* | 9/2010 | Fukuma .................. F16G 13/18 361/679.01 |
| 2011/0000136 A1 | 1/2011 | Brun |
| 2011/0177850 A1 | 7/2011 | Griffin et al. |
| 2011/0292605 A1 | 12/2011 | Chen et al. |
| 2012/0147542 A1 | 6/2012 | Kim |
| 2012/0279014 A1 | 11/2012 | Carlsson |
| 2013/0014346 A1 | 1/2013 | Ahn et al. |
| 2013/0081229 A1 | 4/2013 | Hirano |
| 2013/0135809 A1 | 5/2013 | Uchiyama et al. |
| 2013/0139355 A1 | 6/2013 | Lee et al. |
| 2013/0152342 A1 | 6/2013 | Ahn |
| 2013/0216740 A1 | 8/2013 | Russell-Clarke |
| 2013/0219663 A1 | 8/2013 | Cai |
| 2014/0084772 A1 | 3/2014 | Zhang et al. |
| 2014/0111954 A1 | 4/2014 | Lee et al. |
| 2014/0160055 A1 | 6/2014 | Margolis et al. |
| 2014/0174227 A1* | 6/2014 | Hsu .......................... E05D 3/14 74/98 |
| 2014/0196253 A1* | 7/2014 | Song .................... G06F 1/1601 16/225 |
| 2014/0196254 A1 | 7/2014 | Song |
| 2014/0217875 A1* | 8/2014 | Park ...................... H05K 5/0226 312/326 |
| 2014/0239065 A1 | 8/2014 | Zhou et al. |
| 2014/0245569 A1 | 9/2014 | Cho |
| 2015/0092331 A1 | 4/2015 | Kinoshita et al. |
| 2015/0176317 A1* | 6/2015 | Lee .......................... E05D 3/06 16/251 |
| 2015/0277506 A1 | 10/2015 | Cheah et al. |
| 2015/0361696 A1* | 12/2015 | Tazbaz .................. H04M 1/022 361/679.27 |
| 2015/0362956 A1* | 12/2015 | Tazbaz .................. G06F 1/1637 361/679.27 |
| 2016/0132075 A1 | 5/2016 | Tazbaz |
| 2016/0132076 A1 | 5/2016 | Bitz et al. |
| 2016/0187935 A1 | 6/2016 | Tazbaz et al. |
| 2016/0215541 A1 | 7/2016 | Tazbaz et al. |
| 2016/0357226 A1 | 12/2016 | Campbell et al. |

FOREIGN PATENT DOCUMENTS

| | | |
|---|---|---|
| EP | 1464784 A1 | 10/2004 |
| EP | 2765478 A2 | 8/2014 |
| EP | 2765479 A2 | 8/2014 |
| KR | 20140049911 A | 4/2014 |
| WO | 2016/077254 A1 | 5/2016 |

OTHER PUBLICATIONS

Non-Final Office Action mailed Dec. 10, 2015 from U.S. Appl. No. 14/606,979, 20 pages.

Non-Final Office Action mailed Feb. 22, 2016 from U.S. Appl. No. 14/538,775, 23 pages.

International Search Report mailed Jan. 4, 2016 from PCT Patent Application No. PCT/US2015/059798, 13 pages.

International Search Report mailed Jan. 25, 2016 from PCT Patent Application No. PCT/US2015/060959, 11 pages.

International Search Report mailed Jan. 4, 2016 from PCT Patent Application No. PCT/US2015/059799, 13 pages.

"Bi-Fold Hinges", published on May 9, 2012, retrieved at: <<http://catalog.monroehinge.com/category/bi-fold-hinges>>, 1 page.

"Multi-function stainless steel hydraulic shower door pivot hinge", retrieved on Sep. 10, 2015, at <<http://www.alibaba.com/product-detail/Multi-function-stainless-steel-hydraulic-shower__60153561047.html>>, 10 pages.

"Plastic Slatband Chains", retrieved on Sep. 10, 2015, at <<http://www.irp.co.za/wp-content/assets/LFC002-7.5-Straight-Running-Double-Hinge-Chain.pdf>>, 1 page.

"Samet SoftCover hinge wins the Innovation Award 2013", Feb. 8, 2013, retrieved from <<http://www.kozsusanidesign.com/samet-softcover-hinge-wins-the-innovation-award-2013/>>on Sep. 9, 2014, 2 pages.

"Single and Double Hinge Type LBP (820 & 821 LBP)", Retrieved on: Sep. 10, 2015, at: <<http://www.papadopoulos-bros.gr/en/proionta/erpystries-metaforikes-tainies/erpystries/plastikes/eutheias/monou-kai-diplou-mentese-typou-lbp-820-821-lbp/>>.

"Straight Running Chains", Published on: Jul. 15, 2013, at: <<http://www.ultraplastindia.com/stainless-steel-slat-chains.html>>.

"System Plast LF 820 K400 Acetal Straight Running Chain, 4 Width, 120" Length, Single Hinge, Retrieved on: Sep. 10, 2015, at: <<http://www.amazon.com/System-Plast-Acetal-Straight-Running/dp/B00MJXUDIA>>.

International Search Report and Written Opinion mailed Apr. 12, 2016 from PCT Patent Application No. PCT/US2016/013815, 19 pages.

Article 34 Demand mailed May 4, 2016 from PCT Patent Application No. PCT/US2015/059798, 17 pages.

Final Office Action mailed Jun. 1, 2016 from U.S. Appl. No. 14/606,979, 48 pages.

Article 34 Demand mailed Jun. 8, 2016 from PCT Patent Application No. PCT/US2015/060959, 14 pages.

Non-Final Office Action mailed Mar. 29, 2016 from U.S. Appl. No. 14/588,138, 34 pages.

International Search Report and Written Opinion mailed Feb. 22, 2016 from PCT Patent Application No. PCT/US2015/064173, 13 pages.

Response filed Mar. 3, 2016 to the Non-Final Office Action mailed Dec. 10, 2015 from U.S. Appl. No. 14/606,979, 16 pages.

Non-Final Office Action mailed Mar. 31, 2016 from U.S. Appl. No. 14/538,786, 16 pages.

Response filed Jun. 29, 2016 to the Non-Final Office Action mailed Feb. 22, 2016 from U.S. Appl. No. 14/538,775, 12 pages.

Response filed Jun. 29, 2016 to the Non-Final Office Action mailed Mar. 29, 2016 from U.S. Appl. No. 14/588,138, 10 pages.

Response and Demand filed Jun. 15, 2016 from from PCT Patent Application No. PCT/US2015/064173, 13 pages.

(56) References Cited

OTHER PUBLICATIONS

Response filed Jun. 30, 2016 to the Non-Final Office Action mailed Mar. 31, 2016 from U.S. Appl. No. 14/538,786, 12 pages.
Final Office Action mailed Jul. 29, 2016 from U.S. Appl. No. 14/588,138, 31 pages.
Response filed Aug. 26, 2016 to the Final Office Action mailed Jun. 1, 2016 from U.S. Appl. No. 14/606,979, 15 pages.
Applicant-Initiated Interview Summary mailed Aug. 29, 2016 from U.S. Appl. No. 14/606,979, 3 pages.
Non-Final Office Action and Examiner Initiated Interview Summary mailed Sep. 22, 2016 from U.S. Appl. No. 14/606,979, 27 pages.
Preliminary Amendment filed Sep. 26, 2016 from U.S. Appl. No. 15/239,417, 7 pages.
Response and Demand filed Apr. 6, 2016 from PCT Patent Application No. PCT/US2015/059799, 20 pages.
Final Office Action mailed Oct. 14, 2016 from U.S. Appl. No. 14/538,775, 63 pages.
Interview Summary filed Oct. 11, 2016 from U.S. Appl. No. 14/606,979, 2 pages.
Second Written Opinion mailed Oct. 10, 2016 from PCT Patent Application No. PCT/US2015/060959, 7 pages.
Response filed Oct. 31, 2016 to the Final Office Action mailed Jul. 29, 2016 from U.S. Appl. No. 14/588,138, 10 pages.
Second Written Opinion mailed Oct. 31, 2016 from PCT Patent Application No. PCT/US2015/059799, 8 pages.
Second Written Opinion mailed Jan. 2, 2017 from PCT Patent Application No. PCT/US2016/013815, 6 pages.
Response filed Nov. 28, 2016 to the Written Opinion mailed Apr. 12, 2016 from PCT Patent Application No. PCT/US2016/013815, 10 pages.
Response filed Dec. 8, 2016 to the Second Written Opinion mailed Oct. 31, 2016 from PCT Patent Application No. PCT/US2015/059799, 12 pages.
International Search Report and Written Opinion mailed Nov. 14, 2016 from PCT Patent Application No. PCT/US2016/048898, 16 pages.
Response filed Dec. 7, 2016 to the Second Written Opinion mailed Oct. 10, 2016 from PCT Patent Application No. PCT/US2015/060959, 8 pages.
Response filed Dec. 13, 2016 to the Non-Final Office Action mailed Sep. 22, 2016 from U.S. Appl. No. 14/606,979, 22 pages.
Supplemental Response filed Dec. 8, 2016 to the Response filed Jun. 30, 2016 from U.S. Appl. No. 14/538,786, 8 pages.
Applicant-Initiated Interview Summary mailed Dec. 20, 2016 from U.S. Appl. No. 14/538,775, 3 pages.
Amended claims filed Dec. 22, 2016 from PCT Patent Application No. PCT/US2015/059798, 6 pages.
Notice of Allowance mailed Dec. 27, 2016 from U.S. Appl. No. 14/538,786, 54 pages.
Response filed Jan. 3, 2017 to the Final Office Action mailed Oct. 14, 2016 from U.S Appl. No. 14/538,775, 9 pages.
Non-Final Office Action mailed Jan. 6, 2017 from U.S Appl. No. 14/866,697, 72 pages.
Corrected Notice of Allowability mailed Jan. 13, 2017 from U.S. Appl. No. 14/538,786, 26 pages.
Non-Final Office Action mailed Jan. 20, 2017 from U.S Appl. No. 14/588,138, 12 pages.
International Preliminary Report on Patentability mailed Jan. 24, 2017 from PCT Patent Application No. PCT/US2015/059799, 8 pages.
International Preliminary Report on Patentability mailed Jan. 30, 2017 from PCT Patent Application No. PCT/US2015/059798, 6 pages.
Non-final Office Action mailed Feb. 24, 2017 from U.S Appl. No. 14/538,775, 42 pages.
Corrected Notice of Allowability mailed Jan. 25, 2017 from U.S. Appl. No. 14/538,786, 6 pages.

* cited by examiner

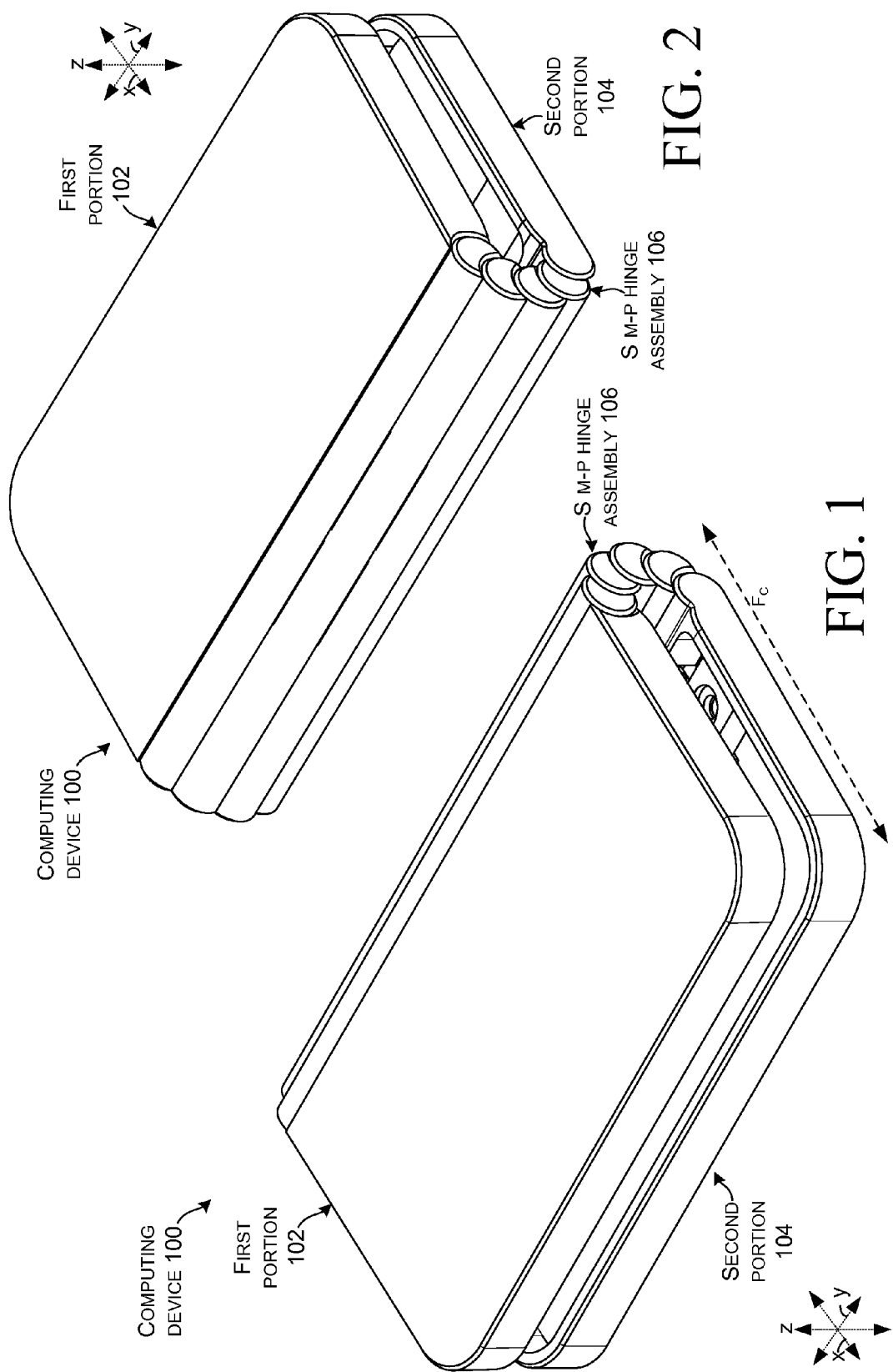

MULTI-PIVOT HINGE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIGS. 1-4 show perspective views of an example device that includes a sequential multi-pivot hinge assembly example in accordance with some implementations of the present concepts.

DESCRIPTION

The present concepts relate to computing devices employing multi-pivot or multi-axis hinge assemblies to rotatably secure portions of the computing device. The present hinges can be thought of as sequential hinges in that the multi-pivot hinge assemblies can control a relative order in which individual hinges rotate. One such configuration can cause the hinges to operate in a predefined order from first to last (e.g., sequentially). As such, the multi-pivot hinge assemblies can be termed 'sequential multi-pivot hinge assemblies'.

Figure 3:
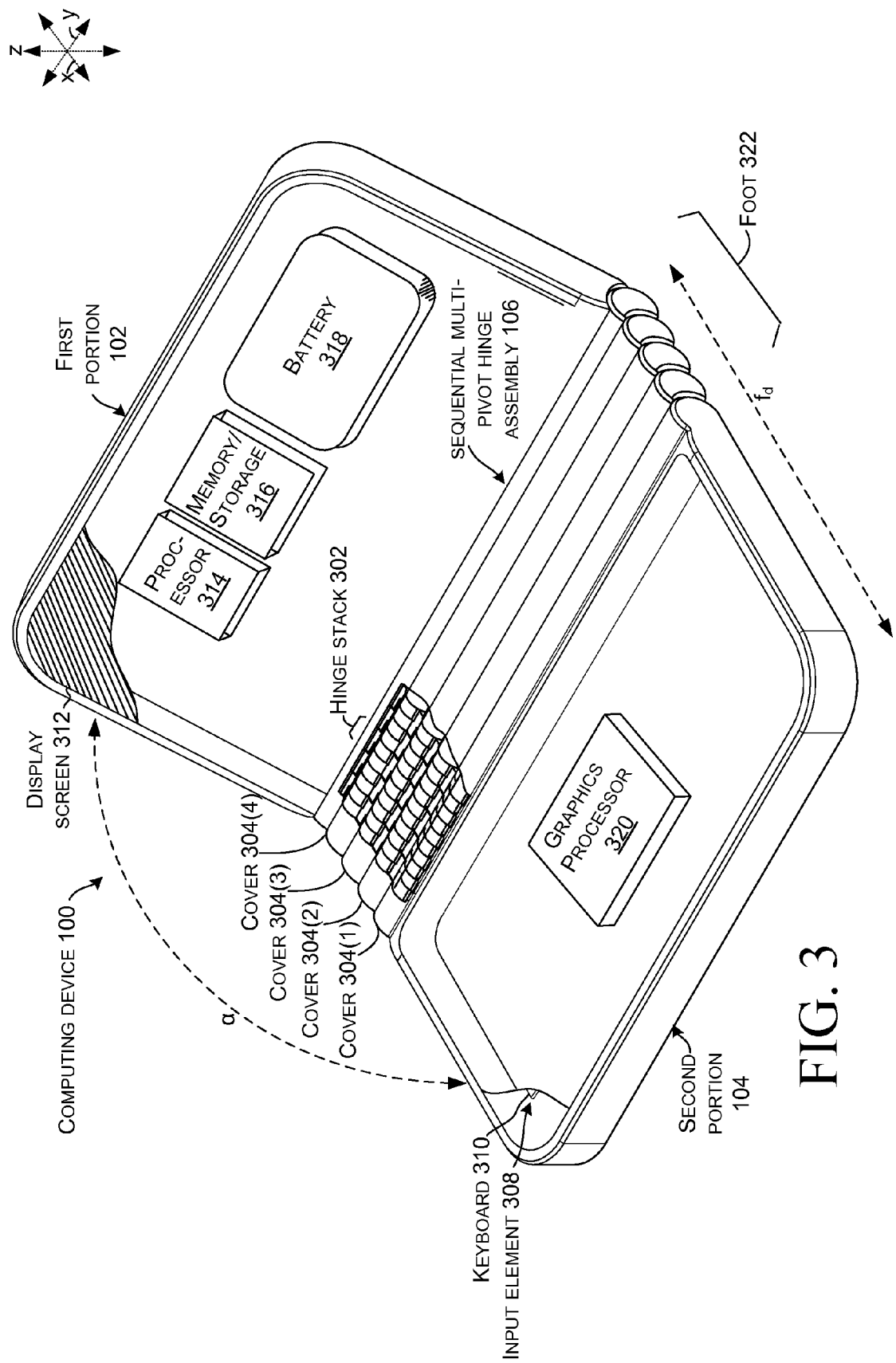

Introductory FIGS. 1-3 collectively show an example of a computing device 100. In this example, computing device 100 has first and second portions 102 and 104 that are rotatably secured together by a sequential multi-pivot hinge assembly 106. FIGS. 1-2 show the computing device in a 'closed' position. FIG. 1 shows the computing device 100 from the 'front' and FIG. 2 shows the computing device from the 'back.' FIG. 3 is a partial cut-away perspective view that shows the computing device in an 'open' or 'deployed' position. In this example, in the deployed position, the first and second portions can define an obtuse angle α relative to one another, as opposed to an angle close to zero in the closed position of FIGS. 1-2. In other implementations, the deployed position can be 90 degrees or less or 180 degrees or more (e.g., a book like configuration). For instance, the deployed position may be somewhere in the range of 90 degrees to 180 degrees that is a comfortable viewing angle for the user.

As can be appreciated from FIG. 3, the sequential multi-pivot hinge assembly 106 can include multiple hinge stacks 302. Aspects of the sequential multi-pivot hinge assembly 106 are described in more detail below relative to FIGS. 5-10. In this example, the sequential multi-pivot hinge assembly includes rigid articulating hinge covers 304 that can obscure and/or protect the underlying elements, including the hinge stacks 302. Other implementations do not include the rigid articulating covers. Still other implementations can include a flexible hinge cover that extends between the first portion 102 and the second portion 104 over the sequential multi-pivot hinge assembly 106.

As evidenced in FIG. 3, computing device 100 can also include an input element or device 308. In this case the input device 308 is manifest as a keyboard 310. Other implementations can employ other input devices. In this example, the computing device can also include a display screen 312, such as a touch sensitive display screen. The computing device can also include a processor 314, memory/storage 316, a battery 318, and/or a video or graphics processor 320, among other components/elements. These elements can be positioned in the first portion 102 and/or second portion 104.

In this case, the second portion 104 can be configured to be positioned on a generally horizontal surface (not specifically designated), such as a table top. In the closed position of FIGS. 1-2, the first and second portions are generally parallel to one another and the horizontal surface (e.g., the first portion is juxtaposed over the second portion). In contrast, in the deployed position of FIG. 3, the first portion is rotated away from the second portion, in this case to an obtuse angle.

Note that in the closed position of FIGS. 1-2, the sequential multi-pivot hinge assembly 106 can provide a footprint $f_c$ that is compact and easy to carry. Note also, that in this implementation the progressive or sequential nature of the sequential multi-pivot hinge assembly 106 can increase or expand the footprint of the computing device when the device is transitioned from the closed or storage position of FIGS. 1-2 to the open or deployed position of FIG. 3. For example, compare the closed footprint $f_c$ to the deployed or expanded footprint $f_d$. This extended footprint feature can be especially valuable in this implementation where some or all of the electronic components, such as the display 312, processor 314, memory/storage 316, and battery 318 are positioned in the first portion 102. The extended footprint provided by the sequential multi-pivot hinge assembly can increase stability of the computing device and reduce the likelihood of the device tipping over backward in the deployed position from the weight of these components. Stated another way, the sequential nature of the sequential multi-pivot hinge assembly can create a foot 322 in the deployed position that can help stabilize the computing device 100 and decrease tipping (e.g., maintain the center of mass over the footprint).

In the implementation shown in FIG. 3, the sequential multi-pivot hinge assembly 106 can be secured to the first and second portions 102 and 104 in a relatively permanent manner (e.g., in a manner that is not intended to be readily separable by an end use consumer). Alternatively, the sequential multi-pivot hinge assembly 106 can be secured to the first and second portions 102 and 104 in a relatively quickly attachable/detachable manner (e.g., in a manner that is intended to be readily separable by the end use consumer). One such example of this latter configuration is shown in FIG. 4.

Figure 4:
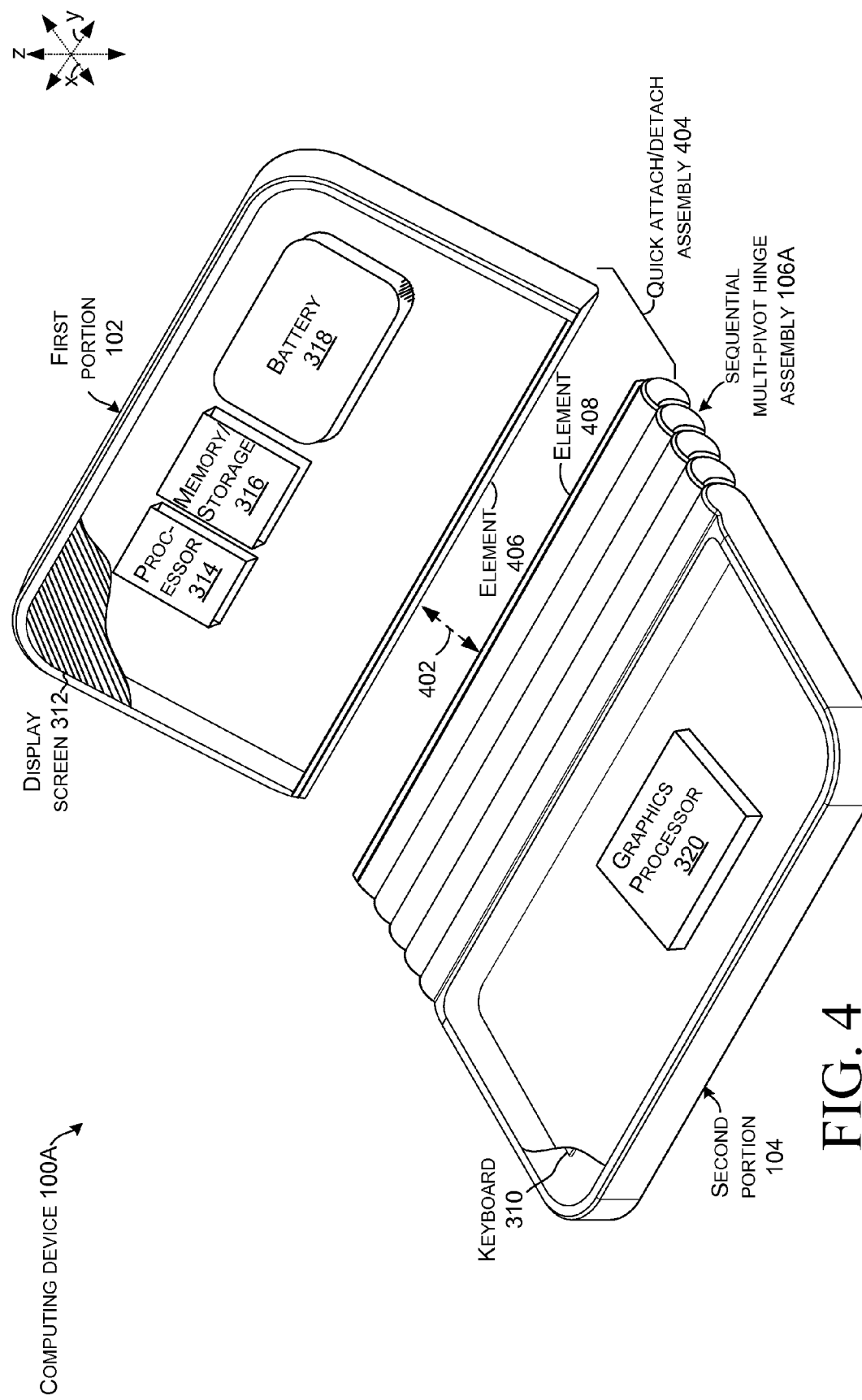

FIG. 4 shows another computing device 100A in a view that is similar to the view of FIG. 3. In this example, the sequential multi-pivot hinge assembly 106A is configured to allow an end use consumer to easily detach either or both of the first and second portions 102 and 104 from the sequential multi-pivot hinge assembly 106A as indicated by arrow 402. In this example the sequential multi-pivot hinge assembly 106 can include a quick attach/detach assembly 404. The quick attach/detach assembly 404 may include cooperatively operating elements 406 and 408 located on the first portion 102 and the sequential multi-pivot hinge assembly 106A, respectively.

In one example, element 406 can be manifest as a latch and element 408 can be manifest as a receiver. The latch can engage the receiver to removeably couple the first portion 102 with the sequential multi-pivot hinge assembly 106A. In another example, the elements 406 and 408 may magnetically couple to one another in a manner that can be overcome by the user to separate the first portion from the sequential multi-pivot hinge assembly 106A. Other quick attach/detach assemblies 404 are contemplated. The sequential multi-pivot hinge assembly 106A may detachably connect with either or both of the first and/or second portions. Alternatively or additionally to mechanical coupling, the quick attach/detach assembly 404 can detachably electrically couple electronic components of the first and second portions. For instance, the quick attach/detach assembly 404 may electrically couple processor 314, storage/memory 316, and/or battery 318 from the first portion 102 to the graphics processor 320 and/or keyboard 310 in the second portion 104.

Thus, the quick attach/detach assembly 404 can allow the user to be able to detach first portion 102 or second portion 104 to use either portion independently of the other. For example, first portion 102 may be operated as a stand-alone tablet device, and then may be attached to second portion 104 via sequential multi-pivot hinge assembly 106A to form a device more akin to a laptop device. A user may also be able to exchange first portion 102 or second portion 104 for application-specific devices. For example, an individual second portion may include a keyboard and/or a touchscreen. In certain scenarios, the user may attach a first touchscreen as the first portion and a second touchscreen as the second portion, and utilize the device like a book. In other scenarios, a user may attach a touchscreen as the first portion and an input device, manifest as a keyboard and trackpad, as the second portion, and utilize the device like a laptop. Other configurations and implementations are contemplated.

Figure 5:
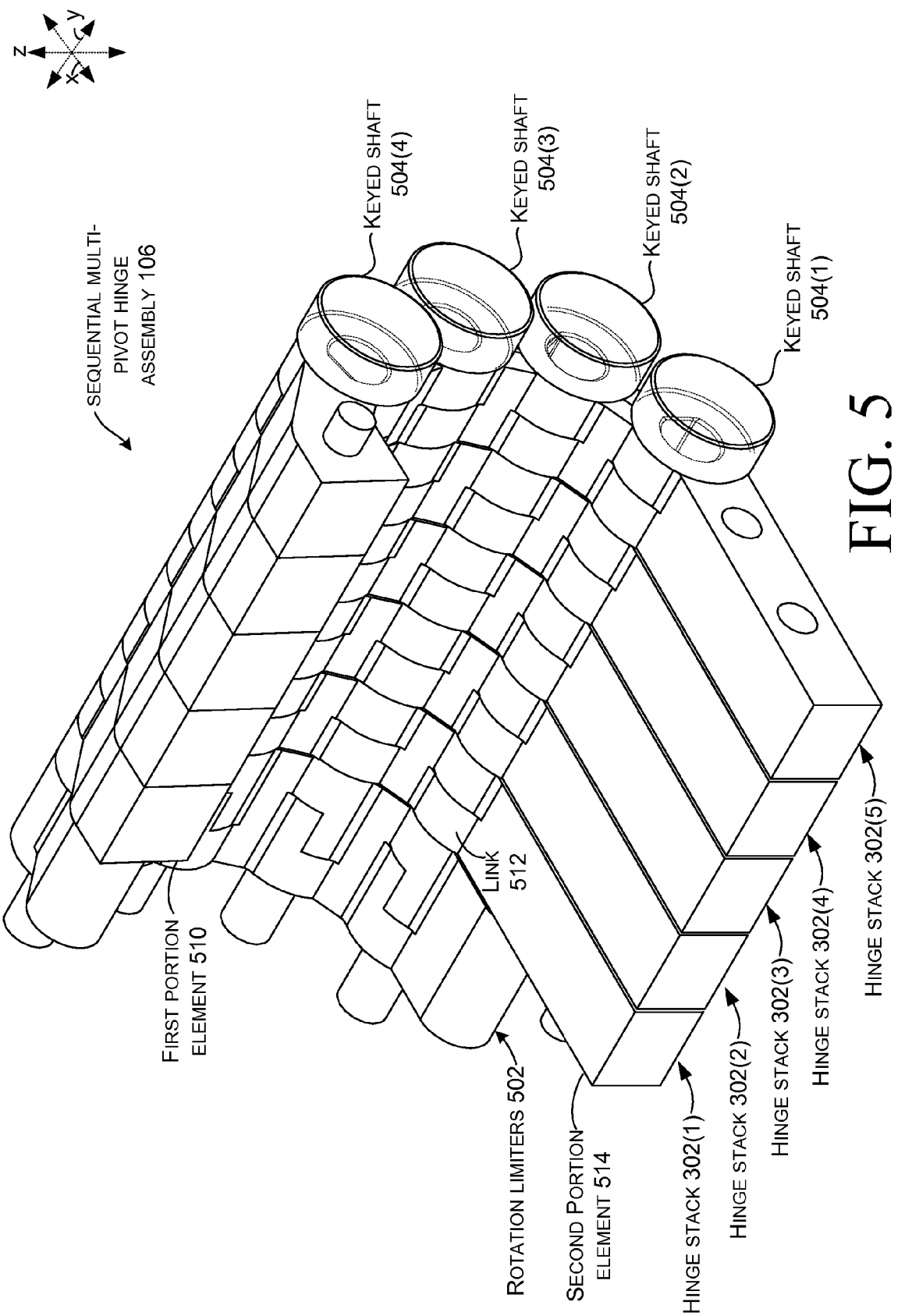
FIGS. 5-6 are perspective views and FIG. 7 is an exploded perspective view of a sequential multi-pivot hinge assembly example in accordance with some implementations of the present concepts.
Figure 6:
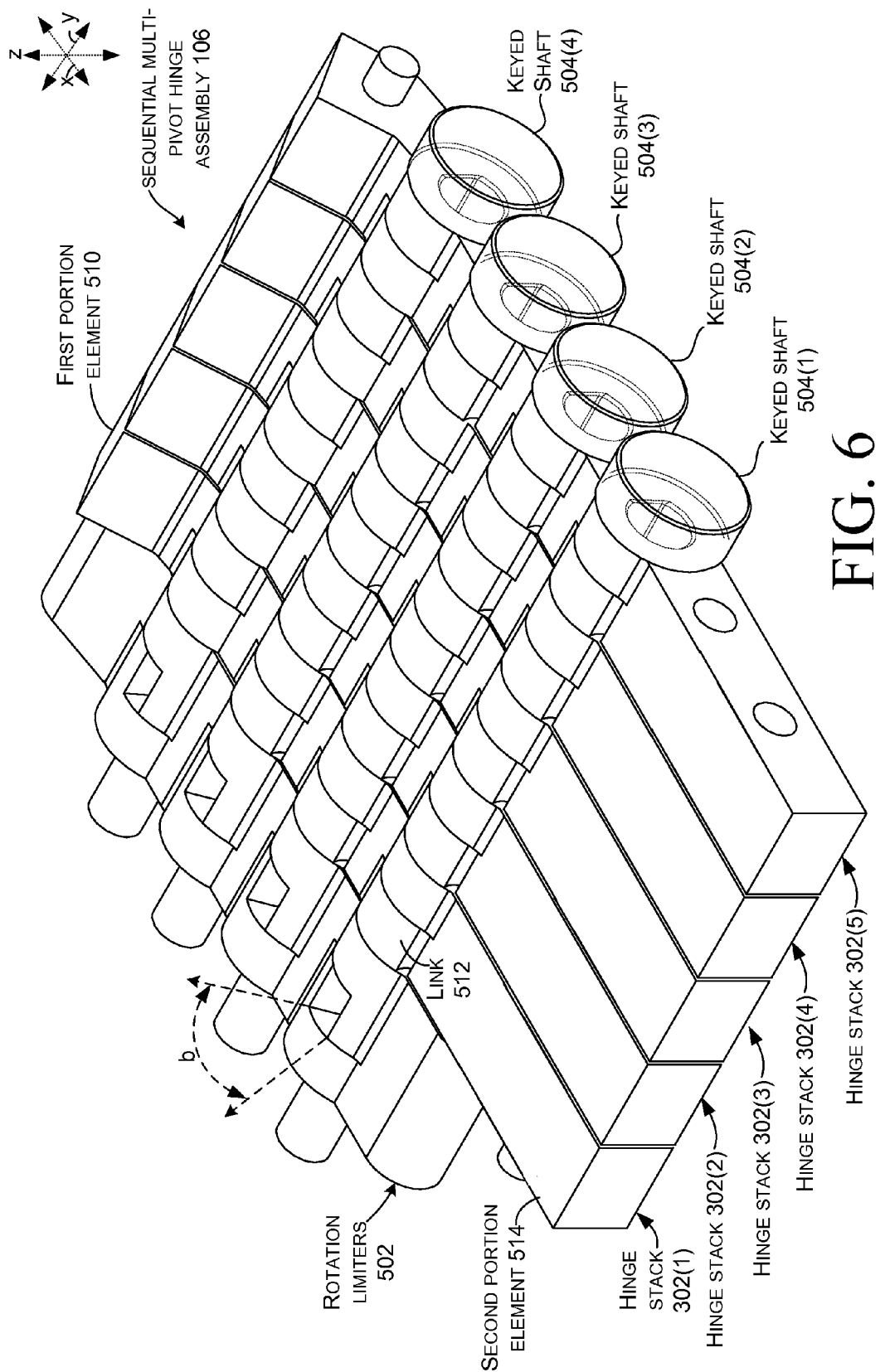
Figure 7:
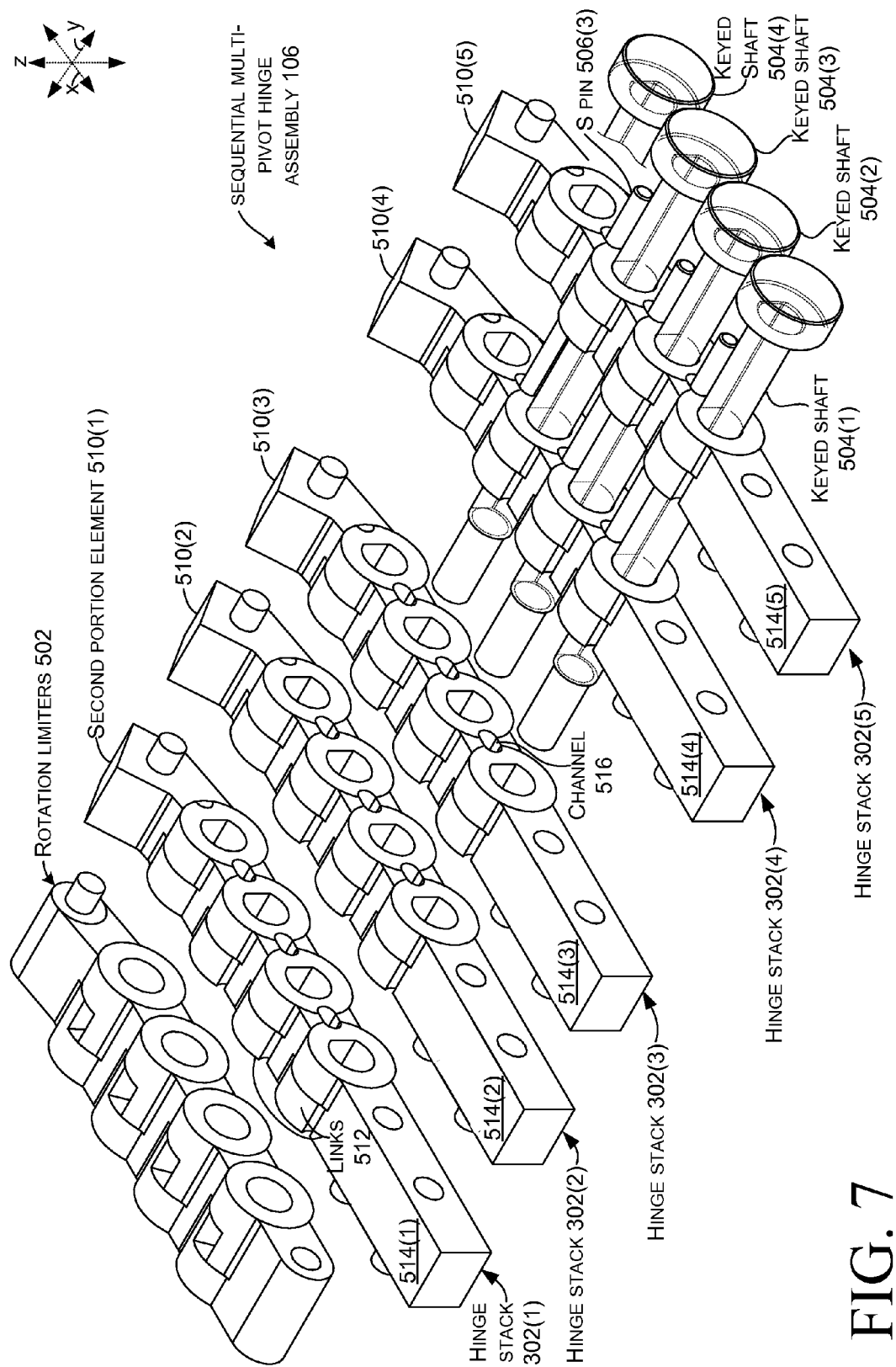
Figure 8A:
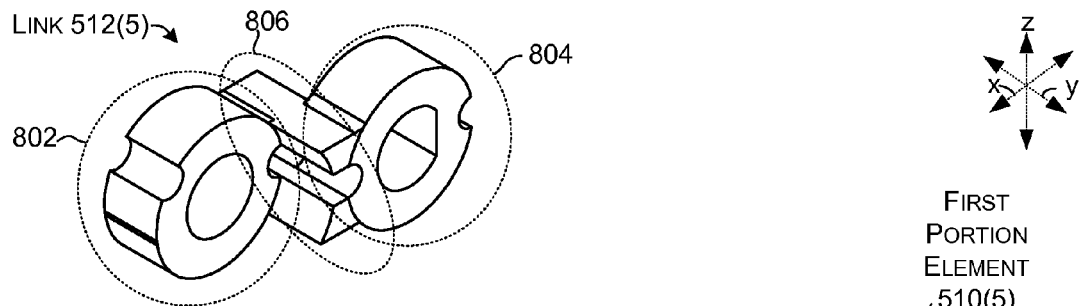
FIG. 8A is a perspective view of an individual link from FIG. 8.
Figure 8:
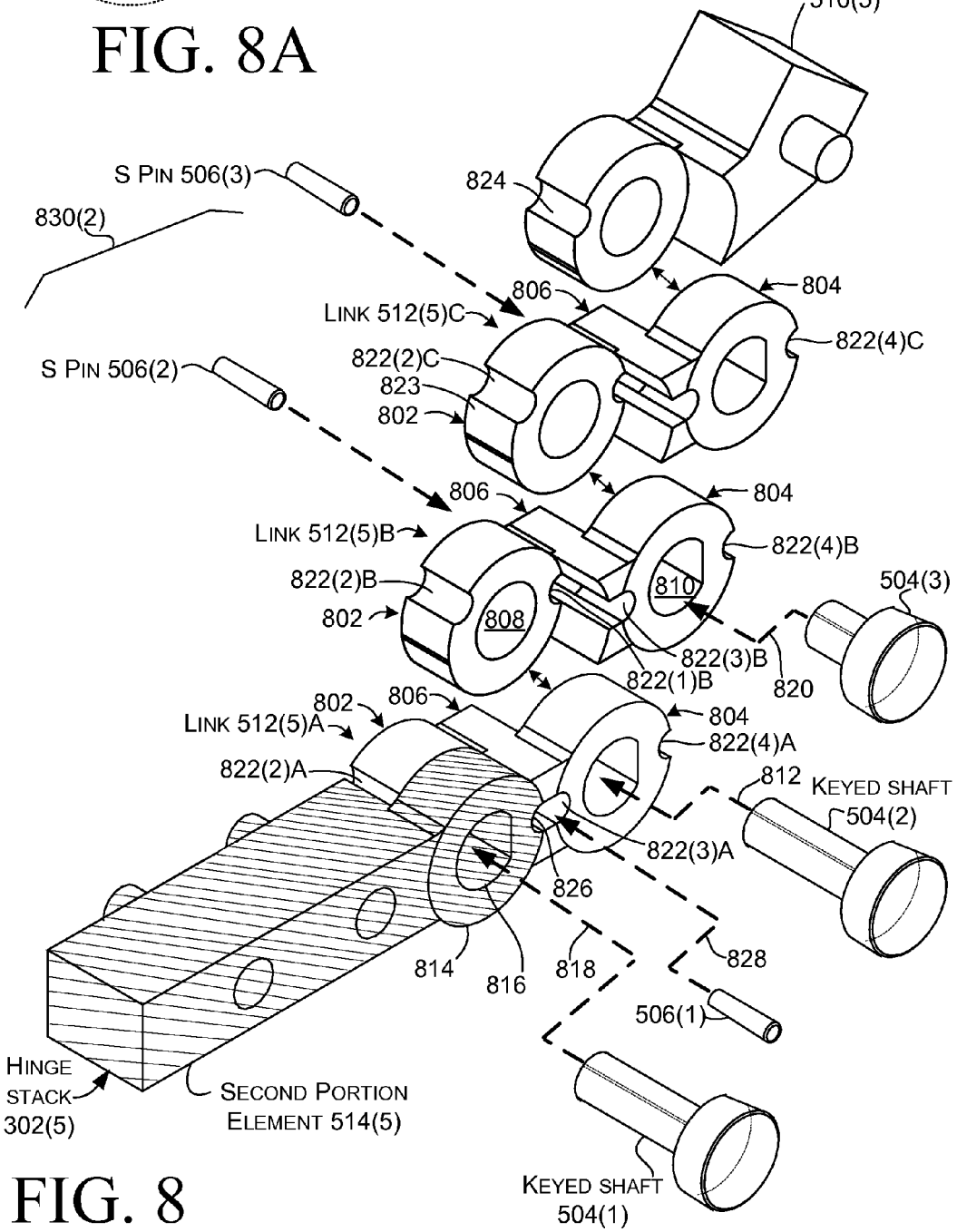
FIG. 8 is an exploded perspective view of an individual hinge stack example introduced in FIG. 7.

FIGS. 5-10 collectively illustrate more details about the example sequential multi-pivot hinge assembly 106 including the hinge stacks 302 introduced above relative to FIG. 3. Note that due to space constraints on the drawing pages, not all elements are labeled in each FIG. and not every instance of every element is labeled, rather representative elements are labeled. FIG. 5 shows the sequential multi-pivot hinge assembly 106 in a closed or storage position similar to FIG. 1. FIG. 6 shows the sequential multi-pivot hinge assembly 106 in an open or deployed position similar to FIG. 3. FIG. 7 shows an exploded view similar to the view of FIG. 6. FIG. 8 is an exploded view of an individual hinge stack 302(5).

Referring to FIGS. 5-8, the example sequential multi-pivot hinge assembly 106 can include rotation limiters 502, keyed shafts 504, sequencing pins 506 (FIG. 7). Individual hinge stacks 302 can include a first portion element 510, multiple radially arranged links 512, and a second portion element 514. The keyed shafts 504 pass through the hinge stacks 302 and the rotation limiters 502. The keyed shafts 504 define the axes of rotation the links 512 rotate (or pivot) around. The sequencing pins can be thought of as a type of locking cam member that reside in channels 516 (FIG. 7) formed through the links 512. Various types of rotation limiters 502 can be utilized. As illustrated relative to FIG. 6, individual rotation limiters can define the degrees of rotation b (FIG. 6) around an individual axis of rotation.

FIG. 8 shows a partially exploded individual hinge stack 302(5). In this case, link 512(5)A is positioned against second portion element 514(5). In this view the second portion element 514(5) is shown with cross-hatching to aid the reader in distinguishing the second portion element from the link 512(5)A. Note that individual links 512 have an offset configuration with a first region 802 connected to a second region 804 by a central region 806. Note that FIG. 8 includes a large number of structures and designators. For clarity purposes, FIG. 8A shows an individual link 512(5) in isolation with the individual first region 802, second region 804 and central region 806 circled. From one perspective the offset nature of the individual links can be characterized as approximating a portion of a lightning bolt shape (e.g., when viewed along the xz reference plane).

Referring to FIG. 8 and FIG. 8A, the first region 802 can define a first passageway 808. Similarly, the second region 804 can define a second passageway 810 that is parallel to the first. The first region 802 of an individual link, such as link 512(5)B can be aligned with the second region 804 of an adjacent link, such as link 512(5)A to receive an individual keyed shaft 504, such as keyed shaft 504(2) as indicated by arrow 812.

The link's central region 806 can extend generally parallel to a hinge axis defined by the keyed shaft 504. As such, the central region 806 can extend generally parallel to the keyed shaft 504 to support an offset configuration of the link 512(5) where the first and second regions 802 and 804 can define parallel but offset passageways 808 and 810. Thus, in this example, as mentioned above, first region 802 of link 512(5)B can be positioned against the second region of link 512(5)A to receive keyed shaft 504(2) as indicated by arrow 812. The first region 802 of link 512(5)A can in turn be aligned with the second portion element 514(5). The second portion element can include a terminus 814. The terminus can define a passageway 816. Keyed shaft 504(1) can pass through the passageway 816 and passageway 808 of link 822(2)A (passageway 808 of link 822(2)A is not visible, but the passageway is designated relative to link 512(5)B) to rotatably join the second portion element 514(5) to the link 512(5)A as indicated by arrow 818. Similarly, keyed shaft 504(3) can rotatably join the second region 804 of link 512(5)B to the first region 802 of link 512(5)C as indicated by arrow 820.

Note that in this implementation, the keyed shafts 504 do not have a circular profile when viewed transverse their long axis (e.g., when viewed along the xz reference plane). Instead in this case, the keyed shafts have a profile that approximates a capital "D". Second passageway 810 has a similar profile so that the keyed shaft is keyed or locked relative to the second region 804. In contrast, the first passageway 808 has a circular profile. This configuration can allow the 'back' link to rotate around the keyed shaft while preventing the 'front' link from rotating around the keyed shaft. Thus, it is contemplated that other keyed shaft profiles can be utilized that cause the keyed shaft to be non-rotatable relative to a first link and rotatable relative to a second link. For instance, a star shaped profile could be utilized where the front link's passageway matches the star profile and the back link is circular with a diameter defined by the outer points of the star.

An individual link 512, such as link 512(5)B can define a number of cam surfaces 822. In this example, the link can define four designated cam surfaces 822. A first individual cam surface 822(1) can be formed in first region 802 proximate to central region 806. A second individual cam surface 822(2) can be formed in the first region 802 away from the central region. Similarly, a third individual cam surface 822(3) can be formed in the second region 804 proximate to the central region 806 and a fourth individual cam surface 822(4) can be formed in the first region 802 away from the central region. Note that cam surfaces 822(1) and 822(3) of an individual link 512(5) can partially define channel 516 and thus prescribe a fore-aft translational degree of freedom (e.g., in the x reference direction relative to FIG. 8) for an individual sequencing pin 506. Thus, in some cases, as will be described in more detail below, cam surfaces 822(1) and 822(3) simply define channel 516 (FIG. 7), while surfaces 822(2) and 822(4) are involved in controlling rotation by individual links. Also note that not all cam surfaces are specifically discussed and designated. For instance, an additional cam surface 823 (designated only relative to link 512(5)C can work cooperatively with cam surface 822(2)C to move sequencing pin 506(2) translationally (e.g., in the negative x reference direction relative to FIG. 8). Note also that first portion element 510(5) has a cam surface 824 that operates cooperatively with link 512(5)C and second portion element 514(5) has a cam surface 826 that operates cooperatively with link 512(5)A to receive sequencing pin 506(1) as indicated by arrow 828. From one perspective, the cam surfaces and sequencing pins can function as a rotation control element or rotation control sub-assembly 830. For instance, cam surface 822(4)A of link 512(5)A, cam surface 822(2)C of link 512(5)C, and sequencing pin 506(2) function as rotation control element 830(2) to control when rotation occurs around the rotation axis defined by keyed shaft 504(3) relative to rotation around keyed shafts 504(2) and 504(4) (FIG. 7). Other rotation control elements 830 are contemplated.

Figure 9:
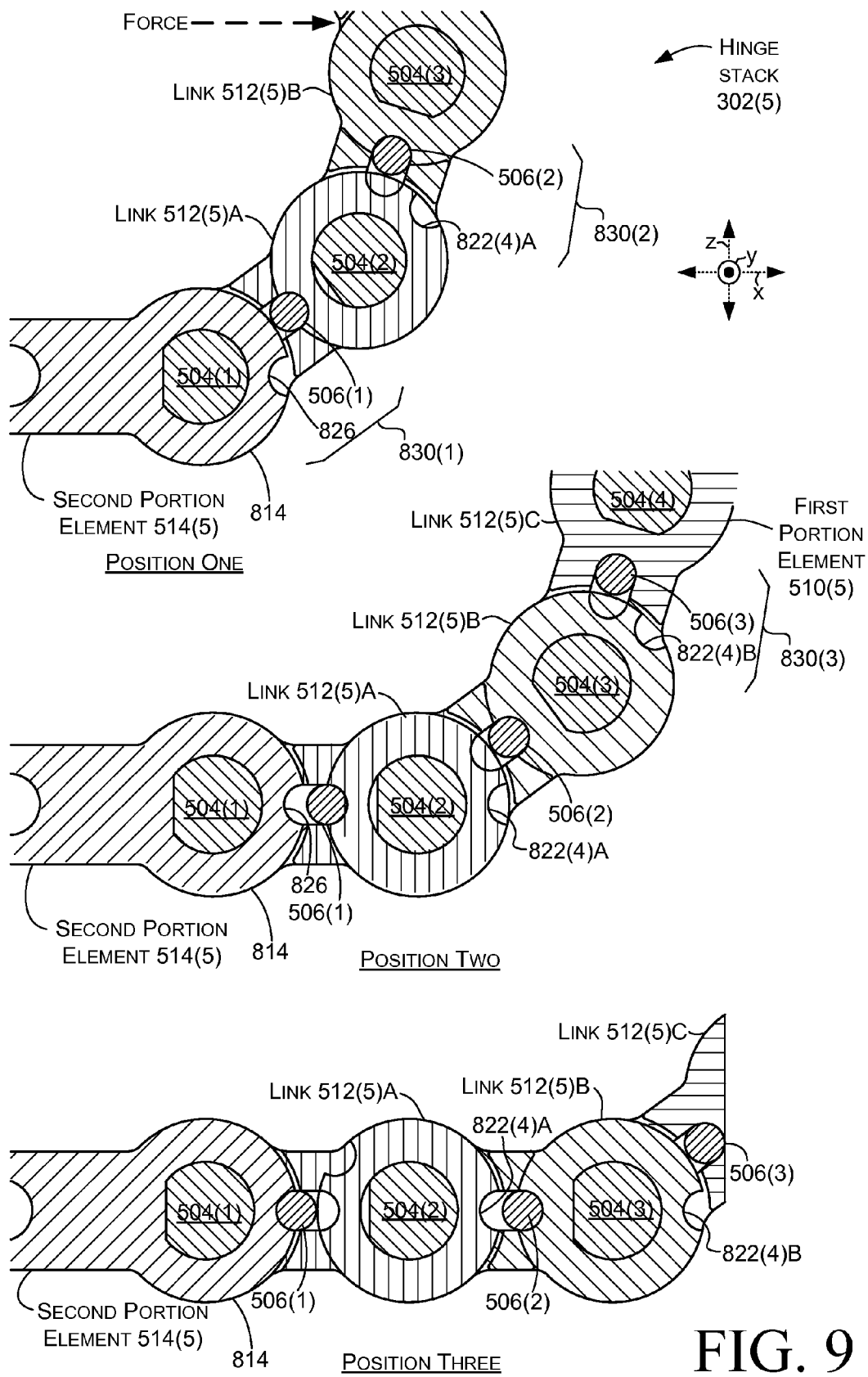
FIGS. 9-10 show elevational views of a sequential multi-pivot hinge assembly example in accordance with some implementations of the present concepts.

FIG. 9 shows sectional views of hinge stack 302(5) in three positions. These sectional views are taken along the xz reference plane. Position One is analogous to the closed position of FIG. 5. In this case, a force is being applied to the hinge stack in the positive x direction. Relative to rotation control elements 830(1) the force can cause link 512(5)A to rotate around keyed shaft 504(1). However, note that relative to rotation control elements 830(2), rotation around keyed shaft 504(2) is blocked because sequencing pin 506(1) is engaging cam surface 822(2)B (hidden from view in FIG. 9, see FIG. 8) of link 512(5)B. Sequencing pin 506(1) cannot be cammed away from cam surface 822(2)B because at this point the sequencing pin 506(1) is not aligned with cam surface 826 of terminus 814. Similarly, relative to rotation control elements 830(3) (Position Two) sequencing pin 506(2) is blocking rotation around keyed shaft 504(3) since sequencing pin 506(2) is engaging cam surface 822 (2)C (see FIG. 8) of link 512(5)C and is not aligned with cam surface 822(4)A of link 512(5)A.

Position Two shows rotation around keyed shaft 504(1) to a point where camming surface 826 is aligned with sequencing pin 506(1) and camming surface 822(2)B of link 512 (5)B (hidden from view). At this point, the force can begin to cause rotation around keyed shaft 504(2) and camming surface 822(2)B of link 512(5)B (See FIG. 8) can cam (e.g., move) sequencing pin 506(1) in the negative x reference direction (e.g., toward camming surface 826) and continue rotating around keyed shaft 504(2).

Position Three is an intermediary position (e.g., partially deployed) between the closed position of FIG. 5 and the deployed position of FIG. 6 and shows rotation around keyed shaft 504(3) to a point where cam surface 822(4) of link 512(5)A is aligned with sequencing pin 506(2). Because there is now a place for sequencing pin 506(2) to move to, the force can cause camming surfaces 822(2)C and 823 (see FIG. 8) of link 512(5)C to cam the sequencing pin in the negative x reference direction as rotation commences around keyed shaft 504(3). This process can be repeated for sequencing pin 506(3) and keyed shaft 504(3).

Figure 10:
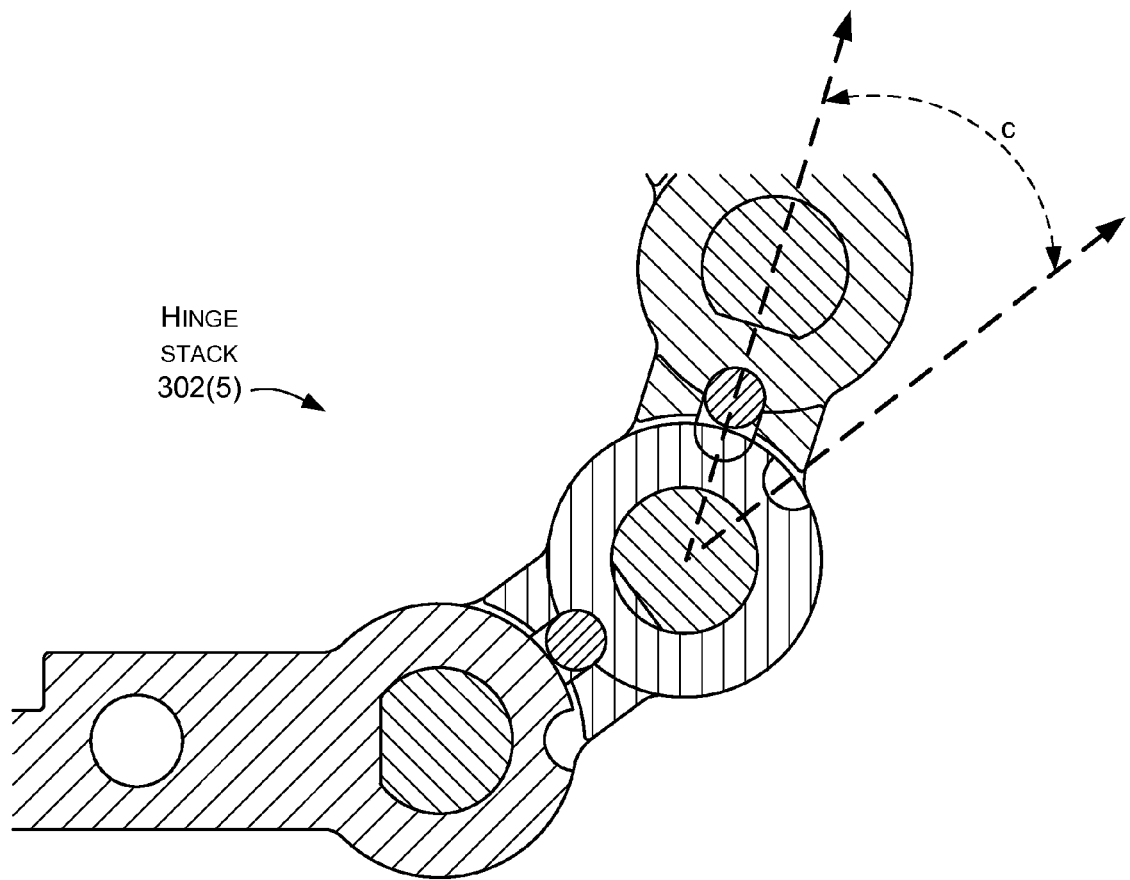

Thus, starting in the closed position of Position One, when a force is applied to the hinge stack 302(5) (e.g., to the sequential multi-pivot hinge assembly) rotation starts at the hinge axis (e.g., keyed shaft 504(1)) closest to the second portion 104. Rotation around the next closest hinge axis cannot commence until rotation around the closest hinge axis has completed a defined range of rotation of the camming surfaces (See angle c of FIG. 10. FIG. 10 is similar to Position One of FIG. 9). This process is repeated in a sequential manner from closest to the second portion to furthest from the second portion. In a similar manner when the process is reversed to close the computing device, rotation begins around the hinge axis furthest from the second portion and moves toward the second portion only as each hinge axis completes its defined rotation and the respective sequencing pin 506 can move in the positive x reference direction. Thus, the rotation control elements can control the relative order of rotation around individual hinge axes of hinge stacks 302 of the sequential multi-pivot hinge assembly 106 (FIG. 7).

Thus, some implementations of the sequential multi-pivot hinge assembly can employ sliding sequencing elements, such as pins, that cam off opposing link cam surfaces to lock and unlock individual sequencing pins. This configuration can allow the sequential multi-pivot hinge assembly to roll and unroll in a controlled sequential manner that enables the hinge to be used as a foot to support a laptop like device, for example. The unrolling action can move the device fulcrum backwards providing a longer wheel base (e.g., extended footprint) for the device in turn making the device less likely to tip over when a user interacts with the touch screen.

Further, some implementations of the sequential multi-pivot hinge assembly can include multiple pivots or axes of rotation and links. Between each pivot, individual links can have a sliding (or otherwise moving) rotation locking element that is moved into position via camming action embedded within the links that forces the rotation locking element fore and aft to lock and unlock connecting links. The rotation locking element can enable communication between links to enable only one active pivot at a time.

Example Methods

Various methods of manufacture, assembly, and use for sequential multi-pivot hinge assemblies are contemplated beyond those shown above relative to FIGS. 1-10.

Additional Examples

Various examples are described above. Additional examples are described below. One example is manifest as a first portion that includes a display screen and a second portion that includes an input device. This example also includes a sequential multi-pivot hinge assembly rotatably securing the first portion and the second portion from a storage position where the first portion is juxtaposed over the second portion to a deployed position where the first portion is oriented at an obtuse angle relative to the first portion. The sequential multi-pivot hinge assembly can include multiple hinge stacks and rotation control elements. Individual hinge stacks can be coupled to the first and second portions and can include multiple radially arranged links that rotate around individual hinge axes. Individual rotation control elements can be interposed between individual adjacent links to control a relative order of rotation of the individual adjacent links depending upon whether the first portion and second portion are being rotated from the storage position to the deployed position or from the deployed position to the storage position Any combination of the above and/or below examples where the rotation control elements comprise sequencing pins.

Any combination of the above and/or below examples where the individual links have opposing offset first and second regions connected by a central region. Individual first regions can define first passageways and individual second regions define second passageways that are parallel to the first passageways. An individual first region of an individual first link can be rotatably secured to an individual second region of an individual second link by a shaft that defines an individual axis of rotation of the sequential multi-pivot hinge assembly. An individual second region of a third individual link can be secured to a first region of the second individual link via a second shaft.

Any combination of the above and/or below examples where the central region of the first link partially defines a channel in which an individual sequencing pin resides and wherein the individual first region of the individual first link defines a first cam surface and the individual second region of the third individual link defines a second cam surface. Also, a relative position of the individual sequencing pin relative to the first and second cam surfaces can determine whether the second individual link can rotate relative to the first individual link.

Any combination of the above and/or below examples where the shaft has a circular profile when viewed transverse the axis of rotation or wherein the shaft is not circular.

Any combination of the above and/or below examples where the shaft is key shaped and a profile of an individual first passageway of the first link matches a profile of the shaft and a profile of an individual second passageway of the second link is circular.

Any combination of the above and/or below examples where the rotation control elements prevent rotation around a second individual hinge axis until a first individual hinge axis has completed a defined number of degrees of rotation.

Any combination of the above and/or below examples where the sequential multi-pivot hinge assembly is configured to create a larger footprint of the computing device in the deployed position than in the storage position.

Any combination of the above and/or below examples where the sequential multi-pivot hinge assembly further comprises a rotation limiter to limit rotation around each axis of rotation to a defined number of degrees.

Any combination of the above and/or below examples where the sequential multi-pivot hinge assembly is visible when in both the storage position and the deployed position.

Any combination of the above and/or below examples further including a hinge cover.

Any combination of the above and/or below examples where the hinge cover comprises multiple rigid hinge covers or wherein the hinge cover comprises a flexible hinge cover that extends from the first portion to the second portion.

Another example is manifest as a first portion and a second portion. The example can include a sequential multi-pivot hinge assembly rotatably securing the first portion and the second portion and including rotation control elements configured to control a relative order of rotation around axes of rotation of the sequential multi-pivot hinge assembly.

Any combination of the above and/or below examples where the rotation control elements comprise locking cam members that engage cam surfaces defined on links that rotate around individual axes of rotation.

Any combination of the above and/or below examples where the locking cam members comprise elongate sequencing pins oriented parallel to the axes of rotation of the sequential multi-pivot hinge assembly.

Any combination of the above and/or below examples where the second portion defines a footprint of the computing device when the first portion is juxtaposed over the second portion in a storage position and when the first portion is rotated away from the second portion to an obtuse angle, the rotation control elements expand the footprint.

Any combination of the above and/or below examples further including electronic components positioned in the first portion and wherein a center of mass of the computing device is located above the expanded footprint.

Any combination of the above and/or below examples where the rotation control elements only allow rotation around a single axis of rotation at a time.

Another example is manifest as a first portion and a second portion. The example can include a sequential multi-pivot hinge assembly rotatably securing the first portion and the second portion to control rotation around individual axes starting proximate to the second portion when rotating the first and second portions apart and starting proximate to the first portion when moving the first and second portions toward one another.

Any combination of the above and/or below examples where the sequential multi-pivot hinge assembly includes rotation control elements. When the first and second portions are moving apart, the rotation control elements prevent rotation around an individual axis that is proximate to the first portion until rotation around another individual axis that is proximate to the second portion has completed a defined angle of rotation. When the first and second portions are moving toward one another the rotation control elements prevent rotation around the another individual axis until rotation around the individual axis has completed the defined angle of rotation.

Another example is manifest as a first portion and a second portion. The example can include a sequential multi-pivot hinge assembly rotatably securing the first portion and the second portion and configured to extend a footprint of the computing device when the first and second portions are rotated away from one another and to contract the footprint when the first and second portions are rotated toward one another.

Another example is manifest as a hinge having a first interface and a second interface. The hinge can also have a sequential multi-pivot hinge assembly rotatably securing the first interface and the second interface to control rotation around individual axes starting proximate to the second interface when rotating the first and second interfaces apart and starting proximate to the first interface when moving the first and second interfaces toward one another Any combination of the above and/or below examples where the sequential multi-pivot hinge assembly comprises rotation control elements. When the first and second interfaces are moving apart, the rotation control elements prevent rotation around an individual axis that is proximate to the first interface until rotation around another individual axis that is proximate to the second interface has completed a defined angle of rotation. When the first and second interfaces are moving toward one another the rotation control elements prevent rotation around the another individual axis until rotation around the individual axis has completed the defined angle of rotation.

Any combination of the above and/or below examples where the first interface comprises an electrical connector and a mechanical latch.

CONCLUSION

Although techniques, methods, devices, systems, etc., pertaining to sequential multi-pivot hinge assemblies are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computing device, comprising:
a first portion that includes a display screen and a second portion that includes an input device; and,
a sequential multi-pivot hinge assembly rotatably securing the first portion and the second portion from a storage position where the first portion is juxtaposed over the second portion to a deployed position where the first portion is oriented at an obtuse angle relative to the second portion, the sequential multi-pivot hinge assembly comprising multiple hinge stacks, individual hinge stacks coupled to the first and second portions and comprising multiple sequencing pins and multiple radially arranged links that rotate around individual hinge axes, individual sequencing pins interposed between individual adjacent links to control a relative order of rotation of the individual adjacent links depending upon whether the first portion and second portion are being rotated from the storage position to the deployed position or from the deployed position to the storage position.

2. The computing device of claim 1, wherein the individual adjacent links include cam surfaces and the cam surfaces and the sequencing pins comprise rotation control sub-assemblies.

3. The computing device of claim 1, wherein the individual links have opposing offset first and second regions connected by a central region, wherein individual first regions define first passageways and individual second regions define second passageways that are parallel to the first passageways, an individual first region of an individual first link rotatably secured to an individual second region of an individual second link by a shaft that defines an individual axis of rotation of the sequential multi-pivot hinge assembly, and wherein an individual second region of a third individual link is secured to a first region of the second individual link via a second shaft.

4. The computing device of claim 3, wherein the central region of the first link partially defines a channel in which an individual sequencing pin resides and wherein the individual first region of the individual first link defines a first cam surface and the individual second region of the third individual link defines a second cam surface and wherein a relative position of the individual sequencing pin relative to the first and second cam surfaces determines whether the second individual link can rotate relative to the first individual link.

5. The computing device of claim 4, wherein the shaft has a circular profile when viewed transverse the axis of rotation or wherein the shaft is not circular.

6. The computing device of claim 5, wherein the shaft is key shaped and a profile of an individual first passageway of the first link matches a profile of the shaft and a profile of an individual second passageway of the second link is circular.

7. The computing device of claim 1, wherein the individual sequencing pins comprise rotation control elements that prevent rotation around a second individual hinge axis until a first individual hinge axis has completed a defined number of degrees of rotation.

8. The computing device of claim 7, wherein the sequential multi-pivot hinge assembly is configured to create a larger footprint of the computing device in the deployed position than in the storage position.

9. The computing device of claim 7, wherein the sequential multi-pivot hinge assembly is visible when in both the storage position and the deployed position.

10. A computing device, comprising:
a first portion that includes a display screen and a second portion that includes an input device; and,
a sequential multi-pivot hinge assembly rotatably securing the first portion and the second portion from a storage position where the first portion is juxtaposed over the second portion to a deployed position where the first portion is oriented at an obtuse angle relative to the second portion, the sequential multi-pivot hinge assembly comprising multiple hinge stacks, rotation control elements, and a rotation limiter to limit rotation around each axis of rotation to a defined number of degrees,
individual hinge stacks coupled to the first and second portions and comprising multiple radially arranged links that rotate around individual hinge axes, individual rotation control elements interposed between individual adjacent links to control a relative order of rotation of the individual adjacent links depending upon whether the first portion and the second portion are being rotated from the storage position to the deployed position or from the deployed position to the storage position.

11. The computing device of claim 10, wherein the rotation limiter comprises multiple individual rotation limiters that are associated with the individual hinge axes.

12. The computing device of claim 10, wherein, in an instance where the first portion and the second portion are being rotated from the storage position to the deployed position, the individual rotation control elements control the relative order of rotation of the individual adjacent links by preventing a second individual adjacent link from rotating until a first individual adjacent link has rotated the defined number of degrees.

13. The computing device of claim 12, wherein, in another instance where the first portion and the second portion are being rotated from the deployed position to the storage position, the individual rotation control elements control the relative order of rotation of the individual adjacent links by preventing the first individual adjacent link from rotating until the second individual adjacent link has rotated the defined number of degrees.

14. A computing device, comprising:
a first portion that includes a display screen and a second portion that includes an input device;
a sequential multi-pivot hinge assembly rotatably securing the first portion and the second portion from a storage position where the first portion is juxtaposed over the second portion to a deployed position where the first portion is oriented at an obtuse angle relative to the second portion, the sequential multi-pivot hinge assembly comprising multiple hinge stacks and rotation control elements; and, a hinge cover positioned relative to the sequential multi-pivot hinge assembly, individual hinge stacks coupled to the first and second portions and comprising multiple radially arranged links that rotate around individual hinge axes, individual rotation control elements interposed between individual adjacent links to control a relative order of rotation of the individual adjacent links depending upon whether the first portion and second portion are being rotated from the storage position to the deployed position or from the deployed position to the storage position.

15. The computing device of claim 14, wherein the hinge cover comprises multiple rigid hinge covers or wherein the hinge cover comprises a flexible hinge cover that extends from the first portion to the second portion.

16. A computing device, comprising:

a first portion and a second portion; and, a sequential multi-pivot hinge assembly rotatably securing the first portion and the second portion and comprising rotation control elements that comprise locking cam members that engage cam surfaces defined on links that rotate around individual axes of rotation, the rotation control elements configured to control a relative order of rotation around axes of rotation of the sequential multi-pivot hinge assembly.

17. The computing device of claim 16, wherein the locking cam members comprise elongate sequencing pins oriented parallel to the axes of rotation of the sequential multi-pivot hinge assembly.

18. The computing device of claim 16, wherein the second portion defines a footprint of the computing device when the first portion is juxtaposed over the second portion in a storage position and when the first portion is rotated away from the second portion to an obtuse angle, the rotation control elements expand the footprint.

19. The computing device of claim 18, further comprising electronic components positioned in the first portion and wherein a center of mass of the computing device is located above the expanded footprint.

* * * * *